United States Patent
Butters et al.

(10) Patent No.: US 6,378,897 B1
(45) Date of Patent: Apr. 30, 2002

(54) DYNAMICALLY DEPLOYED DEVICE ANCHOR AND ASSEMBLY

(75) Inventors: Nathan R. Butters, Tempe; Gregory A. Mowry, Phoenix, both of AZ (US)

(73) Assignee: Simula, Inc., Phoenix, AZ (US)

(*) Notice: Subject to any disclaimer, the term of this patent is extended or adjusted under 35 U.S.C. 154(b) by 0 days.

(21) Appl. No.: 09/630,606

(22) Filed: Aug. 2, 2000

Related U.S. Application Data

(60) Provisional application No. 60/154,944, filed on Sep. 21, 1999.

(51) Int. Cl.[7] ............................................. B60R 21/22
(52) U.S. Cl. .................................. 280/730.2; 280/728.2
(58) Field of Search .......................... 280/730.2, 728.2, 280/730.1, 749, 753; 188/5, 4 R, 4 B, 7, 8

(56) References Cited

U.S. PATENT DOCUMENTS

| | | | | |
|---|---|---|---|---|
| 1,924,276 A | * | 8/1933 | Gerstenberger | 188/5 |
| 3,782,756 A | * | 1/1974 | Brown | 280/749 |
| 5,219,177 A | | 6/1993 | Wang | 280/728 |
| 5,322,322 A | | 6/1994 | Bark et al. | 280/730 |
| 5,344,184 A | | 9/1994 | Keeler et al. | 280/730 R |
| 5,462,308 A | | 10/1995 | Seki et al. | 280/749 |
| 5,480,181 A | | 1/1996 | Bark et al. | 280/730.2 |
| 5,588,672 A | | 12/1996 | Karlow et al. | 280/730.2 |
| 5,605,346 A | | 2/1997 | Cheung et al. | 280/728.2 |
| 5,788,270 A | | 8/1998 | Haland et al. | 280/729 |
| 5,865,462 A | | 2/1999 | Robins et al. | 280/730.2 |
| 5,884,937 A | | 3/1999 | Yamada | 280/730.2 |
| 5,924,723 A | * | 7/1999 | Brantman et al. | 280/730.2 |
| 6,095,551 A | * | 8/2000 | O'Docherty | 280/730.2 |
| 6,158,767 A | * | 12/2000 | Sinnhuber | 280/730.2 |
| 6,168,191 B1 | * | 1/2001 | Webber et al. | 280/730.2 |
| 6,173,989 B1 | * | 1/2001 | Stutz | 280/730.2 |

* cited by examiner

Primary Examiner—Christopher P. Schwartz
Assistant Examiner—Mariano Sy
(74) Attorney, Agent, or Firm—Shaw Pittman LLP

(57) ABSTRACT

A dynamically deployed device ("DDD") assembly comprising a DDD, an anchor, and a mechanical stop, a vehicle member, a tether, or any other device that stops the rotation of the anchor. The anchor can be pivotally fastened to and stowed inside a vehicle structure member, with a DDD cord fastened to the end of the DDD anchor opposite the pivot attachment point. Upon deployment, the inflating DDD pulls the DDD cord tight. The DDD cord in turn pulls the anchor down such that the anchor rotates around its pivot attachment point and comes to rest against the stop, member, tether, or other similar device that stops the rotation. In this secured, locked position, the anchor provides a DDD attachment point offset from the vehicle structure member to which the anchor is fastened. Embodiments of the anchor include a link or cam.

31 Claims, 8 Drawing Sheets

DYNAMICALLY DEPLOYED DEVICE ANCHOR AND ASSEMBLY

This application claims the benefit of the filing date of U.S. Provisional Application No. 60/154,944, filed Sep. 21, 1999.

BACKGROUND

1. Field of the Invention

The present invention relates to the deployment of inflatable tubular structures and other dynamically deployed devices ("DDDs"), and more particularly, to a dynamically deployed device anchor and assembly that optimize the deployment position of a DDD by eliminating the need to affix the DDD directly to a vehicle structure.

2. Background of the Invention

Dynamically deployed devices, such as inflatable tubular structures ("ITSs"), are widely used to protect vehicle occupants during rapid vehicle deceleration, such as the deceleration encountered in a collision. The DDDs used in vehicles are placed throughout the vehicle in strategic locations where occupants can be expected to impact hard components of the vehicle. Generally, DDDs are placed above and below the dashboard on both the driver and passenger side, and are placed along the sides of the vehicle at both head and hip levels. The lower DDDs protect the legs and hips of the occupant while the upper DDDs cushion the head and upper torso.

To adequately protect a vehicle occupant, the DDD must inflate and come to rest between the vehicle structure and the expected final location of the occupant during the collision. In conventional installations, a DDD is attached to a vehicle structure with cords or straps (hereinafter referred to as "cords"), and is stowed in an uninflated state within a component of a vehicle, e.g., the roof rail. During a collision and upon deployment, the DDD inflates, emerges from its stowed location, and pulls taut the cords or straps that attach both sides of the DDD to the vehicle structure. In its deployed position, the DDD is centered between the two points at which the cords or straps are attached to the structure. Thus, the attachment points determine the final deployment location of the DDD.

In the typical automobile application, the ends of a DDD are mounted to a vertical or horizontal member of the vehicle structure. For example, to provide side impact protection for front and rear seat passengers, a DDD could be mounted to the A-pillar and either the C-pillar or D-pillar of an automobile. FIG. 1 illustrates this typical prior art installation, with the DDD attached to the A-pillar A and D-pillar D, and spanning the B-pillar B and the C-pillar C. Similarly, to provide side impact protection to front passengers only (e.g., in two-seat car), a DDD would be attached to A-pillar A and to either roof rail RR or B-pillar B of the vehicle. Thus, provided that the intended deployment location of the DDD is between two points on the vehicle pillar or roof rail, the DDD can be directly attached to the vehicle structure for optimal deployment.

However, often the vertical and horizontal vehicle members do not provide suitable DDD anchor points for several reasons, including component obstruction, protection zone concerns, and deployment characteristics. For example, a seat belt mechanism may obstruct the deployment or attachment of the DDD. Also, using a particular vehicle member may compromise the size of the protected zone. For example, some vehicle platforms place an occupant between the B-pillar and C-pillar. If the DDD must be mounted on the C-pillar, then the DDD cannot protect the full distance between the B-pillar and C-pillar (because of the attachment hardware and cord). Finally, with respect to deployment characteristics, the required speed and tension of deployment, both of which depend on attachment geometry, may preclude attachment to a vehicle member. For example, with vehicles that place an occupant between the B-pillar and C-pillar, the DDD could be anchored to a D-pillar to solve the protection zone concern and provide complete protection between the B-pillar and C-pillar. However, this solution creates negative deployment characteristics, increasing the time the DDD takes to reach its functional position and decreasing the maximum attainable DDD tension (because of the greater length between anchor points).

Vehicle members are also unsuitable anchor points when the optimal length and orientation of a DDD place the cord ends of the DDD somewhere other than along a vehicle structure member. For example, in the two-seater car A-pillar-to-roof-rail-attachment described above, the DDD's final deployment position is necessarily diagonal. If, however, optimal DDD performance requires horizontal deployment, there may be no suitable vertical member on which to affix the DDD, e.g., if B-pillar B is not strong enough or contains other obstructing equipment.

Vehicles such as station wagons, sport utility vehicles, and other commercial utility vehicles also present problems with directly anchoring DDDs to a vehicle member. In these utility vehicles, a compartment of the vehicle typically is not intended for passengers. To provide complete protection in the passenger compartments such as the front and rear passenger seats, the DDD should preferably deploy the full length of the each compartment, making attachment of the DDD to the pillar behind the rear passenger compartment unsatisfactory (as described above). Thus, the DDD must attach to the rearmost pillar, e.g., the D-pillar in a utility vehicle, or to the section of the roof rail between the C-pillar and D-pillar. This attachment method requires a longer, more expensive cord or ITS on the DDD. In addition, the longer distance between attachment points detracts from DDD performance, increasing the time required to reach the functional position and magnifying oscillation. In contrast, having an intermediate anchor point just behind the rearmost pillar of a passenger compartment would allow the DDD to optimally deploy and provide full protection to the full length of each passenger compartment.

Thus, there remains a need for a device that anchors a DDD in an optimal position without relying on the direct attachment of the DDD to a vehicle structure. The device should adequately support the deployment of a DDD and should facilitate positioning of the DDD in a location that provides the most protection for the vehicle occupant.

SUMMARY OF THE INVENTION

The present invention is a dynamically deployed device anchor and assembly that provide a fixed attachment point offset from a vehicle member. The DDD assembly includes a DDD, at least one anchor pivotally attached to the DDD and a vehicle member, and a means for stopping the at least one anchor from rotating past a predetermined angle. In the preferred embodiment of the present invention, the anchor is a link or a cam pivotally fastened to a vehicle structure and the means for stopping rotation is a stop or a tether. A DDD cord is attached to the DDD anchor. Upon deployment, the DDD cord pulls the DDD anchor down around its pivot point and into a locked position against the means for stopping rotation. Once locked, the DDD anchor restrains the cord and provides a fixed attachment point offset from a vehicle structure member, or at least from the point at which the cam is pivotally fastened.

In a first preferred embodiment of the present invention, as shown in FIG. 2, the DDD anchor is a link with one end of the link pivotally attached to a roof rail and the other end attached to the DDD cord. The link is stored horizontally on the roof rail, and upon deployment, pivots down into a vertical position against a means for stopping rotation, e.g., a mechanical stop, as shown in FIG. 2. In a first alternate implementation of the first preferred embodiment, the means for stopping rotation is a tether. With the DDD cord pulling the link against the means for stopping rotation, the DDD anchor provides a DDD attachment point offset from the roof rail.

In a second alternate implementation of the first preferred embodiment, if the slack ratio (deployed length/undeployed length) of the DDD and DDD cord is low, making the undeployed and stowed DDD pull tightly against the attachment points, the DDD link can be configured with a slot in which a DDD cord fastener slides freely. The DDD is attached to the sliding DDD cord fastener. With the DDD link in the stowed position, the sliding DDD cord fastener is positioned closest to the DDD, thereby shortening the undeployed length between DDD attachment points. Upon deployment, the DDD cord pulls the link down, and at the same time, pulls the sliding DDD cord fastener to the bottom end of the pivoting DDD link. When the DDD link pivots against the means for stopping rotation and the sliding DDD cord fastener stops at the end of the DDD link, the DDD anchor provides a DDD attachment point offset from the roof rail.

In a second preferred embodiment of the present invention, the DDD anchor is a cam, e.g., a flat 90° wedge-shaped piece. The cam is pivotally attached through its apex to the roof rail and is held in a stowed position before DDD deployment. Upon deployment, the cam is pulled by the DDD such that it rotates around its pivot attachment point and comes to rest against a means for stopping rotation.

Preferably, the cam is stored with its edge opposite the location of the DDD up against the roof rail. The DDD is attached to the corner of the cam up against the roof rail such that upon deployment when the cord pulls tight, the cam is pulled down. During deployment, the cam rotates and stops at 90° where the other edge of the cam hits the roof rail, which functions as a stop, preventing the cam from rotating further. In this locked position, the cam provides a DDD attachment point offset from the vehicle roof rail. Optionally, in this configuration a mechanical stop is fastened to the roof rail to act as the means for stopping rotation.

In an alternate implementation of the second preferred embodiment, the cam is stowed above the roof rail and the DDD is attached to the lower corner of the cam. Preferably, the means for stopping the rotation of the cam past a predetermined angle is a stop affixed to the roof rail, or alternately, a tether. The DDD pulls the cam down and rotates the cam around its pivot attachment point until the cam is stopped by the means for stopping rotation.

Accordingly, an object of the present invention is to improve the positioning of a DDD to maximize occupant safety.

Another object of the present invention is to decrease the length of a DDD to shorten the duration of deployment and reduce DDD oscillation.

Another object of the present invention is to provide a fixed DDD attachment point that is offset from a vehicle structure member.

Another object of the present invention is to facilitate the optimal placement of a deployed DDD.

These and other objects of the present invention are described in greater detail in the detailed description of the invention, the appended drawings, and the attached claims.

DETAILED DESCRIPTION OF THE INVENTION

Figure 1:
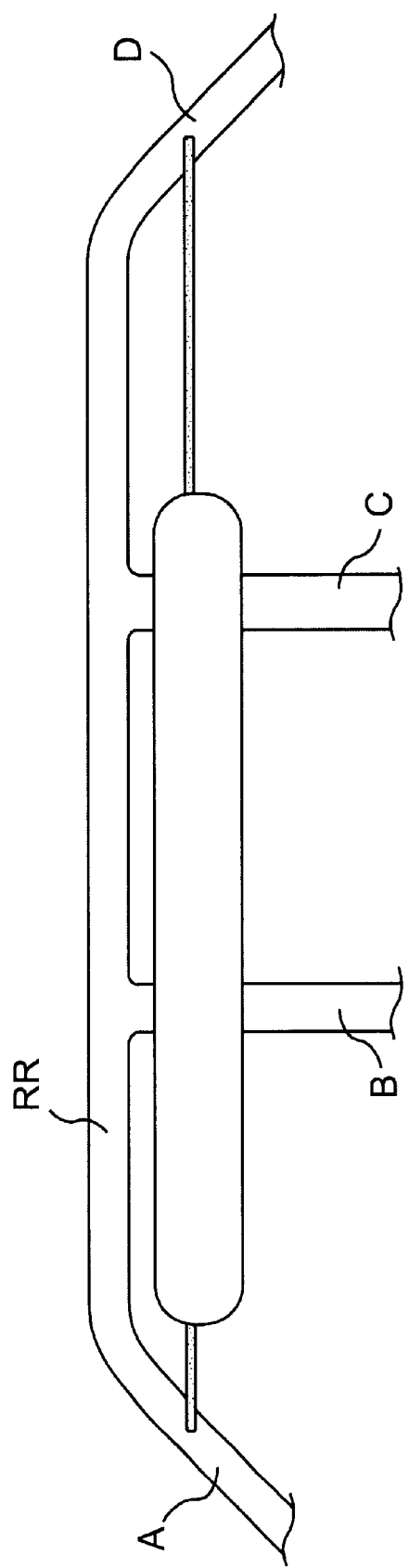
FIG. 1 is a schematic diagram of a prior art deployed DDD attached to a vehicle at the A-pillar and the D-pillar.
Figure 2:
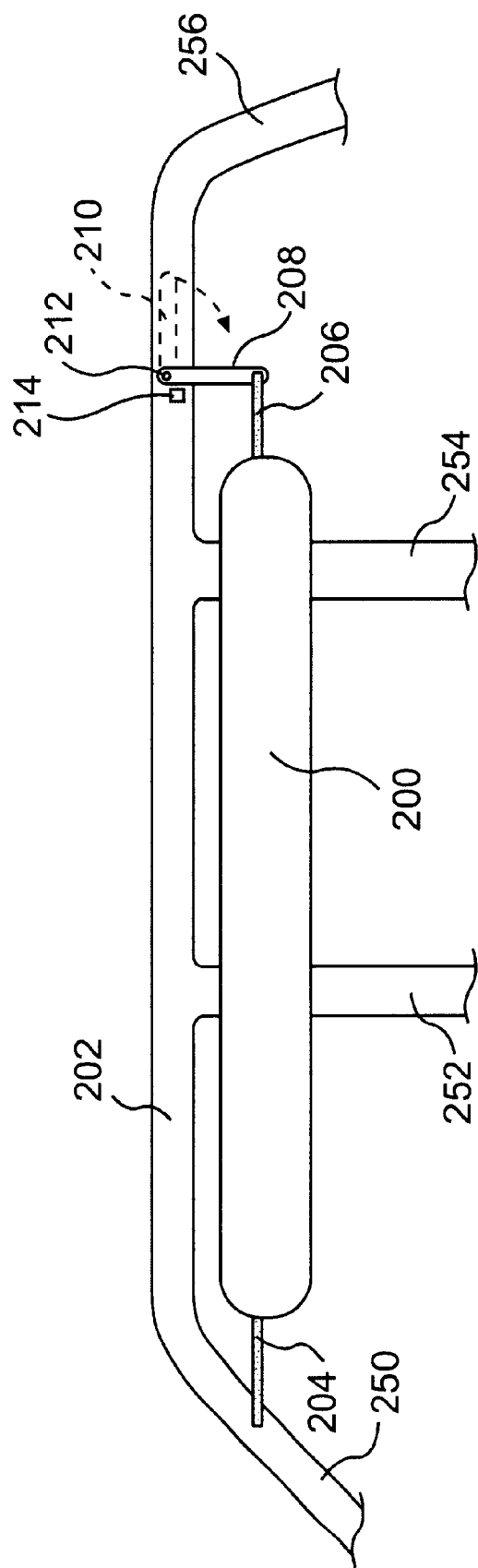
FIG. 2 is a schematic diagram of the present invention, showing a DDD attached to a vehicle at the A-pillar and attached to a DDD link anchor fastened to the roof rail, according to a first preferred embodiment of the present invention.

The present invention is a DDD anchor and a DDD assembly in which the DDD anchor operates. The DDD assembly includes a DDD, at least one DDD anchor that attaches at least one cord of the DDD to a vehicle structure member, and a means for stopping the rotation of the DDD anchor. As a first preferred embodiment of the present invention, FIG. 2 illustrates a DDD 200 installed in a vehicle having a roof rail 202 and four pillars: A-pillar 250, B-pillar 252, C-Pillar 254, and D-pillar 256. Shown in its deployed state, DDD 200 has its forward cord 204 attached to A-pillar 250 and its rearward cord 206 attached to a DDD anchor, which in this preferred embodiment is a DDD link 208.

Before deployment, DDD link 208 is stowed in a horizontal position 210 within roof rail 202. The end of DDD link 208 closest to DDD 200 (the forward end in the example shown in FIG. 2) is pivotally attached to roof rail 202 at attachment point 212, while the opposite end of DDD link 208 (the rearward end in the example of FIG. 2) is attached to cord 206. DDD 200 and cords 204 and 206 are also stowed in roof rail 202. Upon deployment, DDD 200 inflates and pulls cords 204 and 206 taut. In turn, cord 206 pulls DDD link 208 down, pivoting DDD link 208 around to a vertical position resting against a means for stopping rotation, which in this preferred embodiment is a stop 214. Secured against stop 214, DDD link 208 provides a fixed attachment point for DDD 200.

As used in this specification and the claims, "pivotally attached" and "pivotally fastened" mean that a portion of a member, e.g., an anchor or link, is secured while the remaining portion of the member can move or rotate around the secured portion. This pivotal attachment prevents the radial movement of the member while allowing angular movement. Preferably, the pivotal attachment allows for the free rotation of the secured portion around the fixed pivot point. However, "pivotally attached" and "pivotally fastened" also cover a configuration in which the secured portion is fixed and does not rotate, and the remaining portion rotates around the pivot point due to the flexibility of the member material. In this alternate implementation, the member bends or flexes around the pivot point until it contacts the means for stopping rotation.

Figure 3:
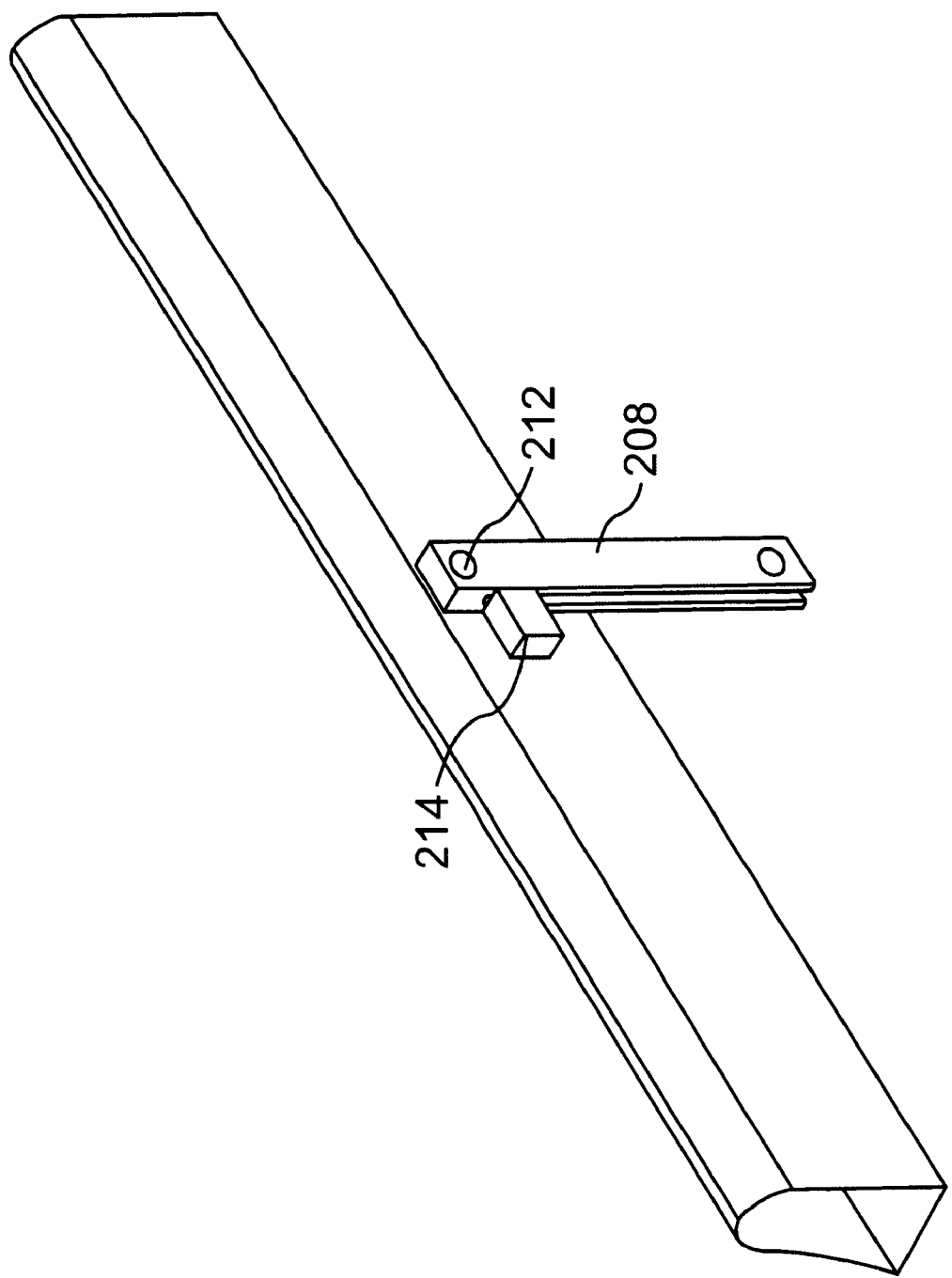
FIG. 3 is a schematic diagram of a DDD link anchor with a mechanical stop as the means for stopping rotation, according to the first preferred embodiment of the present invention.

FIG. 3 shows a DDD anchor comprising DDD link 208 and stop 214, as used in the first preferred embodiment of the present invention. DDD link 208 is shown in the vertical deployed position, having already pivoted around attachment point 212 and come to rest against stop 214.

Figure 3A:
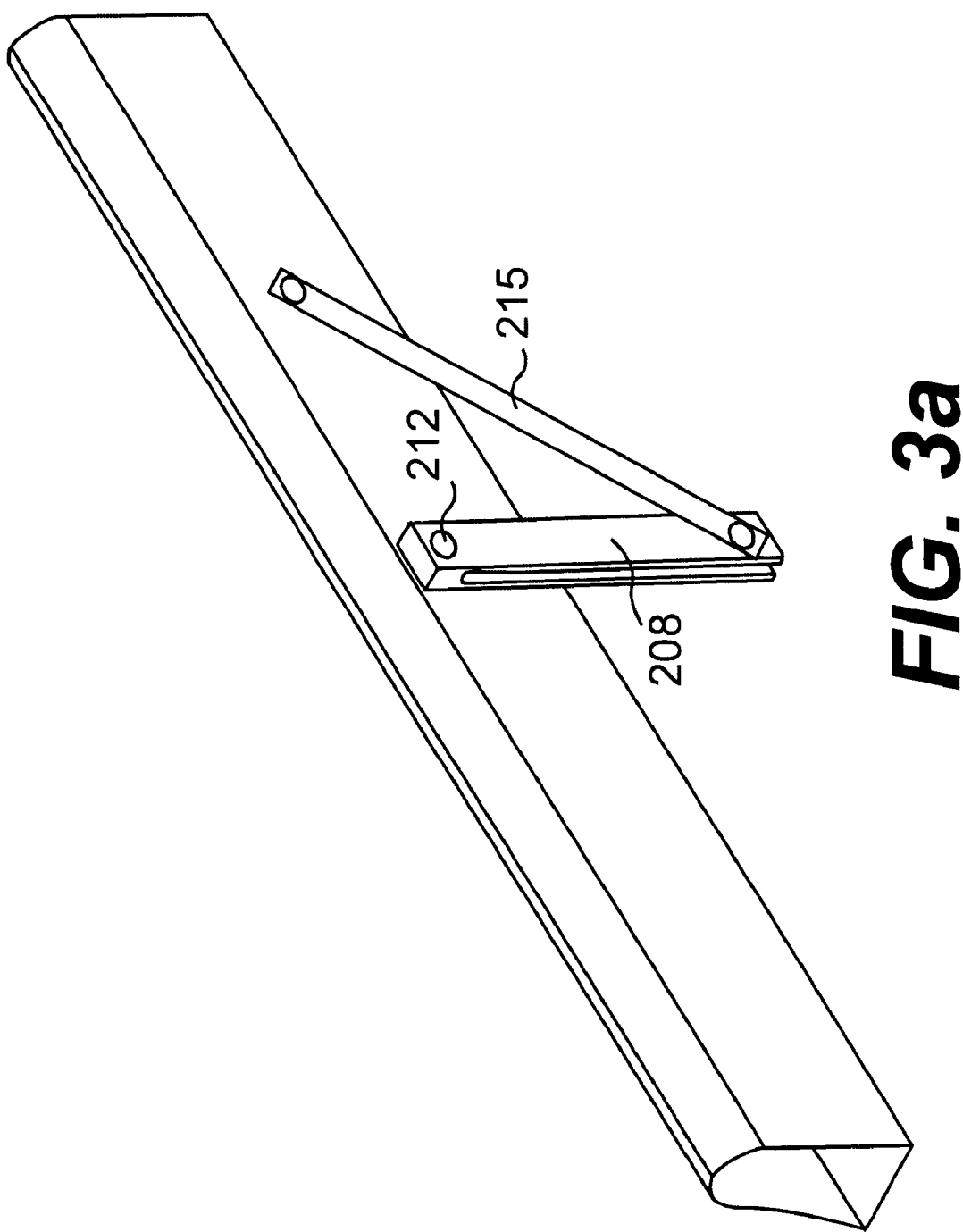
FIG. 3a is a schematic diagram of a DDD link anchor with a tether as the means for stopping rotation, according to a first alternate implementation of the first preferred embodiment of the present invention.

The present invention includes means for stopping DDD link 208 from rotating past a predetermined angle. In the first preferred embodiment of the present invention, the means for stopping rotation is an obstruction in the path of rotation, e.g., a pin or block, as shown by stop 214 in FIG. 3. In a first alternate implementation of the first preferred embodiment, the means for stopping rotation is a tether 215, as shown in FIG. 3a. The predetermined angle depends upon the deployment characteristics of a particular application. In the first preferred embodiment using DDD link 208, the predetermined angle is 90°, through which DDD link 208 moves from a stowed horizontal position to a deployed vertical position. Optionally, the predetermined angle could be from 0°–270° to accommodate fixed attachment points that are offset from the vehicle member short to long distances. For example, a predetermined angle of 10° could result in the fixed attachment point being offset from the vehicle member a short distance. As another example, a predetermined angle of approximately 180° could correspond to a link stowed nearly vertical above its pivot point and deployed almost 180° to a vertical position below its pivot point. As another example, a predetermined angle of approximately 270° could correspond to a link stowed nearly vertical above its pivot point and deployed almost 270° to a substantially horizontal position. The term "nearly vertical" as used herein refers to a position that is or approaches vertical, but still effects the desired direction of rotation by the link. For example, a link may be stowed 5° clockwise of vertical above its pivot point to allow the link to rotate clockwise when pulled by the DDD.

Figure 4:
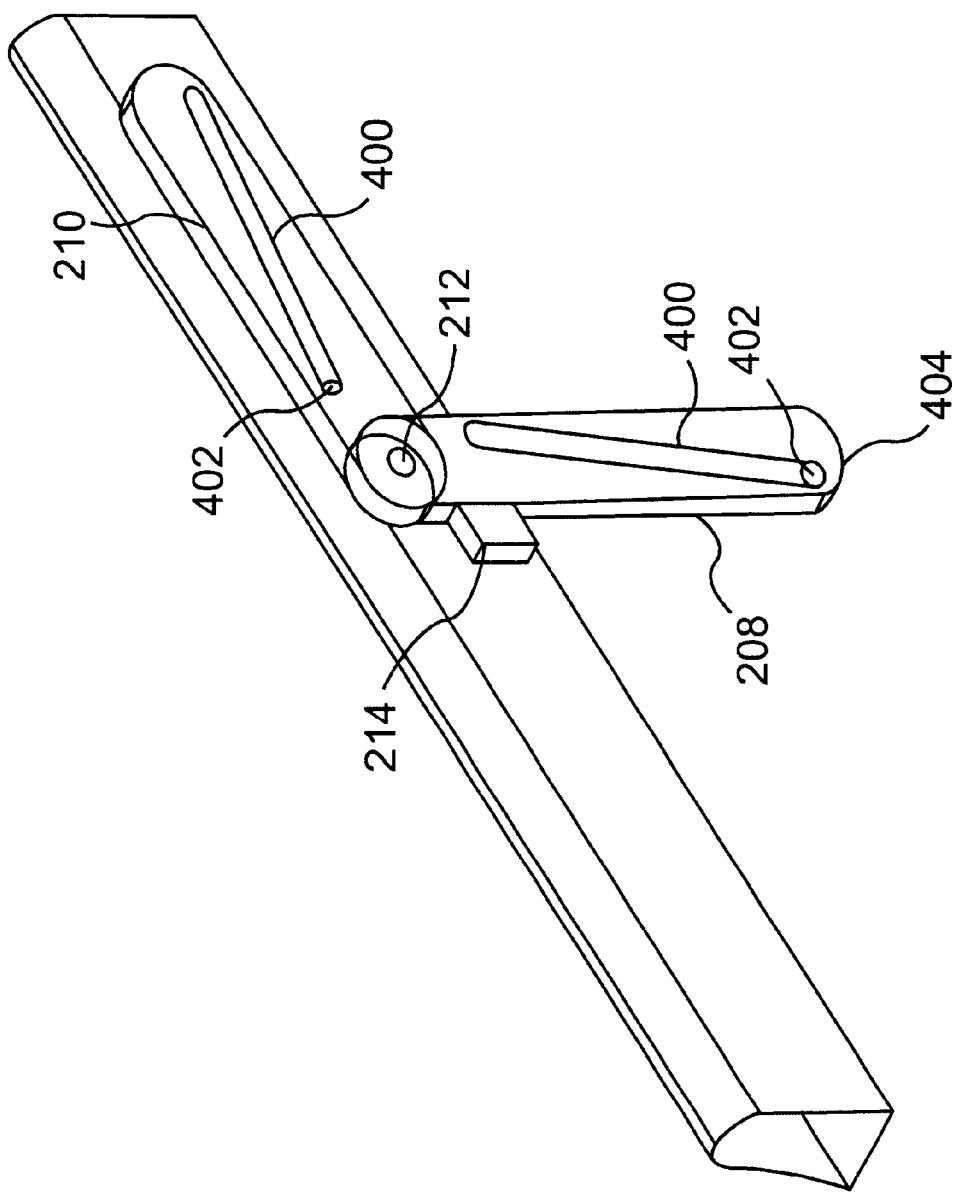
FIG. 4 is a schematic diagram of a slotted DDD link anchor with a sliding DDD cord fastener, according to a second alternate implementation of the first preferred embodiment of the present invention.

In a second alternate implementation of the first preferred embodiment of the present invention, FIG. 4 shows DDD link 208 with a slot 400 and a sliding cord fastener 402 within slot 400. FIG. 4 illustrates this preferred embodiment in both a stowed, horizontal position 210 and a deployed, vertical position 404. While undeployed and stowed, sliding cord fastener 402 rests at the side of DDD link 208 closest to attachment point 212 and DDD cord 206 (not shown in FIG. 4). Upon deployment, DDD cord 206 pulls and pivots DDD link 208 down, and simultaneously pulls sliding cord fastener 402 along slot 400. When DDD link 208 strikes stop 214 and slide cord fastener 402 reaches the end of slot 400, the DDD anchor provides a fixed attachment point for the DDD. Preferably, to ease the movement of sliding cord fastener 402, slot 400 is angled such that the end of slot 400 farthest from attachment point 212 is slightly closer to DDD 200 than the end closest to attachment point 212.

Figure 5:
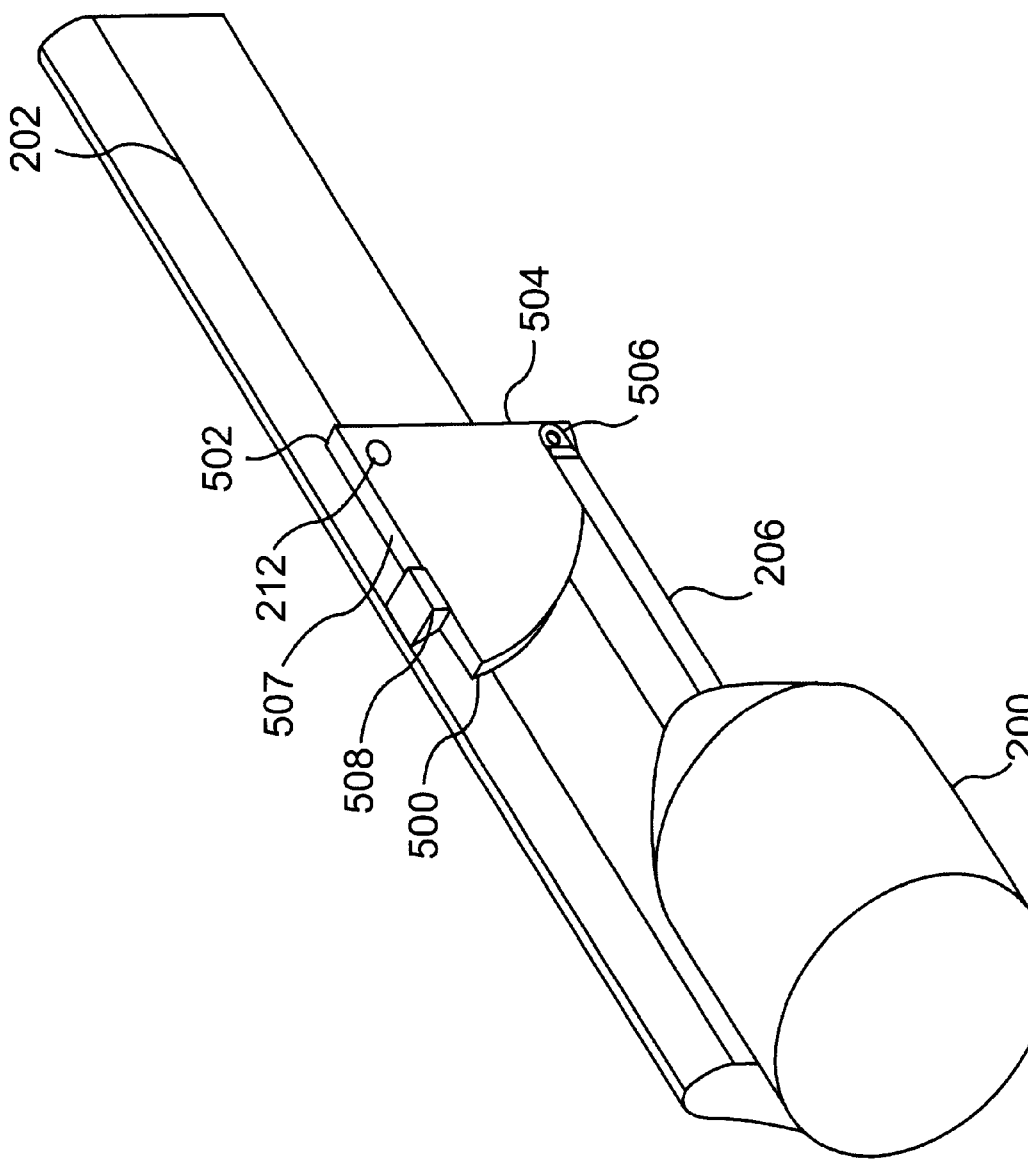
FIG. 5 is a schematic diagram of a DDD cam anchor stored in a roof rail, according to a second preferred embodiment of the present invention.

In a second preferred embodiment of the present invention, the DDD anchor comprises a cam 500. FIG. 5 shows this second preferred embodiment with the DDD anchor in the deployed position. As shown in FIG. 5, cam 500 is preferably a flat wedge, e.g., a 90° portion of a disc, with pivoting attachment point 212 formed at or near its apex 502. Alternatively, apex 502 could be more or less than 90° (e.g., 85°–95°) to accommodate particular orientations of the stored or deployed DDD. Optionally, apex 502 could be approximately 45°–135° to accommodate specific deployment geometries and to control the desired rotational travel of cam 500 (the greater the angle of apex 502, the less it rotates). Held in a stowed position before DDD deployment, cam 500 is pulled by cord 206 such that it rotates around attachment point 212 and comes to rest against a means for stopping the rotation of cam 500 past a predetermined angle. The means for stopping rotation could be roof rail 202 or any other obstruction, e.g., stop 508 shown in FIG. 5.

In this second preferred embodiment, in the stowed position, cam 500 is stored with edge 504 up against roof rail 202. As shown in FIG. 5, edge 504 is the side of cam 500 farthest from DDD 200. DDD cord 206 is attached to point 506 on cam 500. Point 506 is at a location on cam 500 farther from the dynamically deployed device than attachment point 212, when cam 500 is in the stowed position. Preferably, point 506 is near edge 504 as shown in FIG. 5. Upon deployment, cord 206 pulls cam 500 down. Cam 500 rotates 90° around attachment point 212 until edge 507 contacts roof rail 202 (which acts as a stop, or means for stopping rotation). Secured against roof rail 202, cam 500 provides a fixed attachment point for the DDD. Alternately, a stop 508 could be affixed to roof rail 202 to contact edge 507 and stop the rotation of cam 500.

Figure 5A:
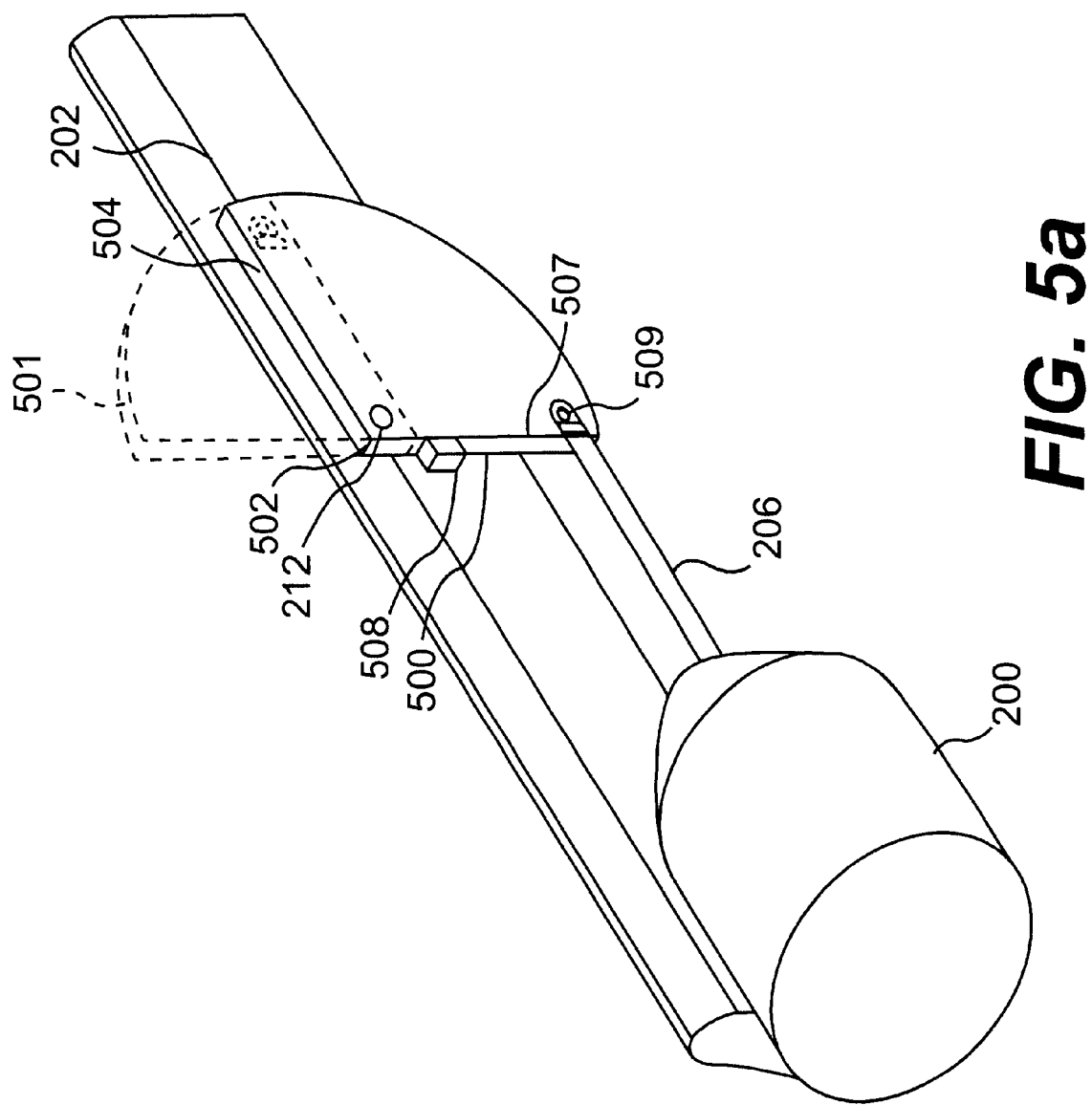
FIG. 5a is a schematic diagram of a DDD cam anchor stored above a roof rail, according to an alternate implementation of the second preferred embodiment of the present invention.

In an alternate implementation of the second preferred embodiment of the present invention, cam 500 is stowed above roof rail 202 as shown by the dotted image 501 in FIG. 5a. Cord 206 is attached at point 509 on edge 507. Preferably, the means for stopping the rotation of cam 500 past a predetermined angle is a stop 508 affixed to roof rail 202. In this configuration, cord 206 pulls cam 500 down and rotates cam 500 around attachment point 212 until edge 507 contacts stop 508.

The present invention includes means to prevent DDD cam 500 from rotating past a predetermined angle. Preferably, the means for stopping rotation is an obstruction in the path of rotation, e.g., a pin or block, as shown by stop 508 in FIGS. 5 and 5a. Optionally, the means for stopping rotation is a tether attached to cam 500 and a vehicle member, similar to tether 215 shown in FIG. 3a.

Figure 6:
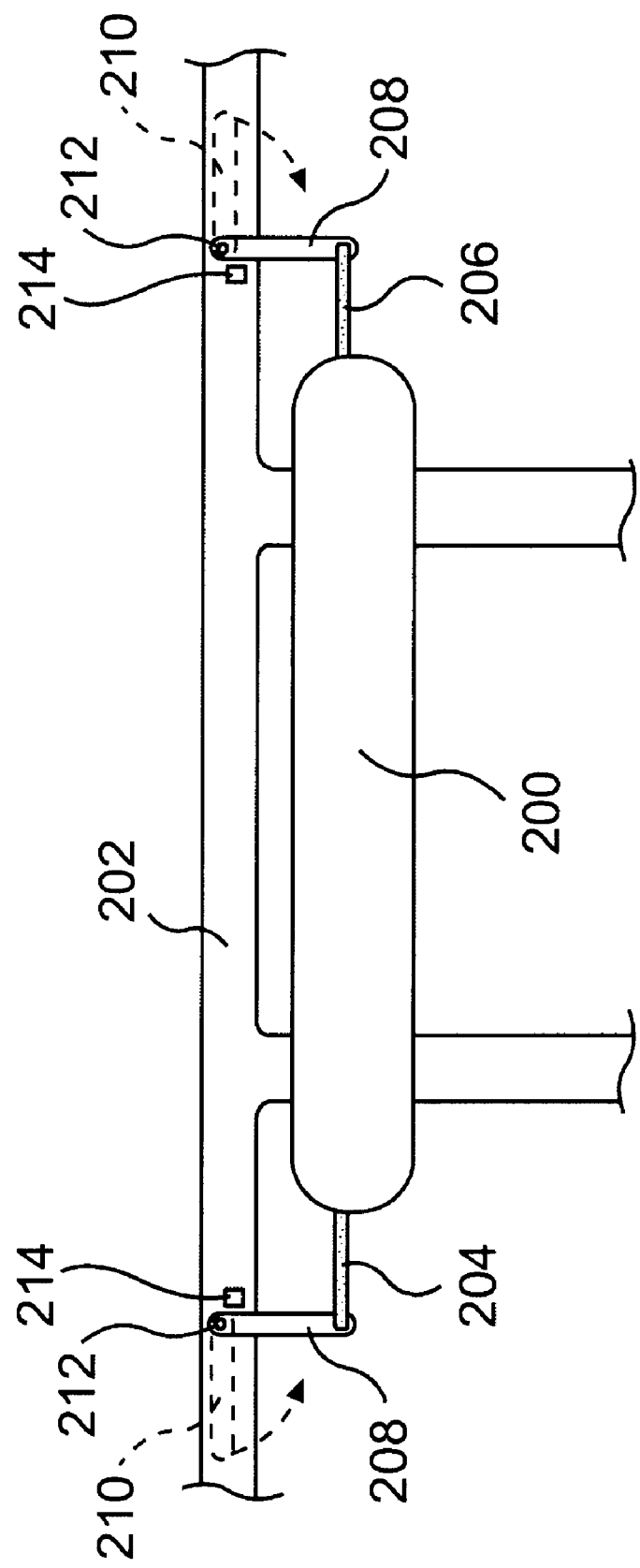
FIG. 6 is a schematic diagram of a DDD assembly in which both ends of a DDD are attached to DDD anchors, according to a third preferred embodiment of the present invention.

As a third preferred embodiment, as shown in FIG. 6, the present invention also includes a DDD assembly in which both ends of DDD 200 are attached to DDD anchors 208 that provide offset fixed attachment. DDD anchors 208 cooperate with means for stopping rotation 214 and provide the same structure and functions described above. During deployment, the expanding DDD 200 pulls on both of its cords 204 and 206, and actuates both DDD anchors 208. DDD anchors 208 rotate from their stowed positions 210 and around attachment points 212. DDD anchors 208 securely lock against means for stopping rotation 214 and provide two offset fixed attachment points for DDD 200.

In all embodiments of the present invention, the exact dimensions and placement of the DDD anchor are designed according to the desired location and configuration of the final DDD deployment. The DDD anchor can be fabricated from metal, plastic, composite, or any other material suitable for resisting the forces developed by the deploying DDD. It can be manufactured by machining, casting, molding, stamping, or any other suitable fabricating technique.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A dynamically deployed device assembly for protecting an occupant in a vehicle, wherein the dynamically deployed device assembly is adapted to be pulled taut by a deploying dynamically deployed device, the assembly comprising:
    (a) a dynamically deployed device having a first cord and a second cord, the first cord attached to a first vehicle member;
    (b) an anchor pivotally attached at a first point to a second vehicle member and attached at a second point to the second cord of the dynamically deployed device; and
    (c) a means for stopping rotation that prevents the anchor from rotating past a predetermined angle.

2. The dynamically deployed device assembly of claim 1, wherein when the anchor pivots against the means for stopping rotation, the anchor provides a fixed attachment point at the second point.

3. The dynamically deployed device assembly of claim 2, wherein the fixed attachment point is offset from the second vehicle member.

4. The dynamically deployed device assembly of claim 2, wherein the fixed attachment point is offset from the first point.

5. The dynamically deployed device assembly of claim 1, wherein the predetermined angle is approximately 90°.

6. The dynamically deployed device assembly of claim 1, wherein the predetermined angle is between 0°–270°, inclusive.

7. The dynamically deployed device assembly of claim 1, wherein the predetermined angle is between approximately 85° and 95°, inclusive.

8. The dynamically deployed device assembly of claim 1, wherein the anchor is a link, the second vehicle member is a roof rail, and the means for stopping rotation is a stop.

9. The dynamically deployed device assembly of claim 8, wherein the link comprises
    (i) a member containing a slot formed longitudinally from near the first point of the anchor to near the second point of the anchor; and
    (ii) a sliding fastener contained in the slot, wherein the sliding fastener is the second point to which the second cord is attached, and wherein the sliding fastener moves within the slot.

10. The dynamically deployed device assembly of claim 1, wherein the anchor is a link, the second vehicle member is a roof rail, and the means for stopping rotation is a tether.

11. The dynamically deployed device assembly of claim 1, wherein the second vehicle member is a roof rail, the means for stopping rotation is the roof rail, and the anchor is a cam of substantially a wedge shape, and wherein the first point is located near an apex corner of the cam and the second point is at a location on the cam farther from the dynamically deployed device than the first point, when the cam is stowed.

12. The dynamically deployed device assembly of claim 11, wherein the apex corner is between approximately 85° and 95°, inclusive.

13. The dynamically deployed device assembly of claim 11, wherein the apex corner is approximately 45°–135°.

14. The dynamically deployed device assembly of claim 1, wherein the second vehicle member is a roof rail, the means for stopping rotation is a stop affixed to the roof rail, and the anchor is a cam of substantially a wedge shape, and wherein the first point is located near an apex corner of the cam and the second point is at a location on the cam farther from the dynamically deployed device than the first point, when the cam is stowed.

15. The dynamically deployed device assembly of claim 1, wherein the second vehicle member is a roof rail, the means for stopping rotation is a tether, and the anchor is a cam of substantially a wedge shape, and wherein the first point is located near an apex corner of the cam and the second point is at a location on the cam farther from the dynamically deployed device than the second point, when the cam is stowed.

16. A dynamically deployed device assembly for protecting an occupant in a vehicle, wherein the dynamically deployed device assembly is adapted to be pulled taut by a deploying dynamically deployed device, the assembly comprising:
    (a) a dynamically deployed device having a forward cord and a rearward cord;
    (b) a first anchor having a first end pivotally fastened to a vehicle and a second end attached to the forward cord;
    (c) a second anchor having a first end pivotally fastened to the vehicle and a second end attached to the rearward cord;
    (d) a first means for stopping rotation that prevents the first anchor from rotating past a first predetermined angle; and
    (e) a second means for stopping rotation that prevents the second anchor from rotating past a second predetermined angle.

17. The dynamically deployed device assembly of claim 16, wherein when the first anchor pivots against the first means for stopping rotation the first anchor provides a first fixed attachment point for the forward cord,
    and wherein when the second anchor pivots against the second means for stopping rotation, the second anchor provides a second fixed attachment point for the rearward cord.

18. The dynamically deployed device assembly of claim 16, wherein the first fixed attachment point and the second fixed attachment point are offset from the vehicle.

19. The dynamically deployed device assembly of claim 16, wherein the first means for stopping rotation prevents the first anchor from rotating past a first predetermined angle in a direction toward the second anchor,
    and wherein the second means for stopping rotation prevents the second anchor from rotating past a second predetermined angle in a direction toward the first anchor.

20. A dynamically deployed device anchor for securing a dynamically deployed device in a vehicle, wherein the dynamically deployed device pulls the dynamically deployed device anchor upon deployment, the dynamically deployed device anchor comprising:
    a longitudinal member having a forward point and a rearward point, wherein the forward point is pivotally attached to the vehicle and the rearward point is attached to the dynamically deployed device, and wherein the forward point is closer to the dynamically deployed device than the rearward point when the longitudinal member is stowed.

21. The dynamically deployed device of claim 20, further comprising a means for stopping rotation that prevents the longitudinal member from rotating toward the dynamically deployed device past a predetermined angle.

22. The dynamically deployed device anchor of claim 21, wherein when the dynamically deployed device inflates and pulls the rearward point, the longitudinal member rotates around the forward point and comes to rest against the means for stopping rotation.

23. The dynamically deployed device anchor of claim 21, wherein the predetermined angle is between 0°–270°, inclusive.

24. The dynamically deployed device anchor of claim 21, wherein the longitudinal member further comprises a slot having a first end proximate the forward point and a second end farther from the forward point than the first end when the longitudinal member is stowed, wherein the rearward point is a sliding fastener that moves within the slot, wherein the rearward point is proximate the forward point when the longitudinal member is stowed, and wherein the rearward point moves within the slot radially away from the forward point as the longitudinal member rotates around the forward point.

25. The dynamically deployed device anchor of claim 24, wherein the slot is configured such that the second end of the slot is closer to the dynamically deployed device than the first end when the longitudinal member rests against the means for stopping rotation.

26. The dynamically deployed device anchor of claim 21, wherein the forward point of the longitudinal member does not rotate and the longitudinal member bends around the forward point until the longitudinal member rests against the means for stopping rotation.

27. A method for anchoring a dynamically deployed device comprising the steps of:
    (a) attaching the dynamically deployed device to a first vehicle member and an anchor;
    (b) pivotally attaching the anchor to a second vehicle member through a pivot end of the anchor;
    (c) stowing the dynamically deployed device;
    (d) stowing the anchor in the second vehicle member with the pivot end closest to the dynamically deployed device;
    (e) deploying the dynamically deployed device such that the deploying dynamically deployed device pulls the anchor around the pivot end; and
    (f) stopping the anchor with a means for stopping rotation.

28. The method of claim 27, wherein the anchor is a link.

29. The method of claim 27, wherein the anchor is a cam.

30. The method of claim 27, wherein the means for stopping rotation stops the anchor at substantially 90° from the second vehicle member.

31. The method of claim 27, wherein the means for stopping rotation is one of a block, a pin, and a tether.

* * * * *